United States Patent
Liu et al.

(10) Patent No.: US 8,727,747 B2
(45) Date of Patent: May 20, 2014

(54) BEARING/STATOR SET RETAINER STRUCTURE

(75) Inventors: Wen-Hao Liu, New Taipei (TW); Guan-Chen Yin, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 158 days.

(21) Appl. No.: 13/296,466

(22) Filed: Nov. 15, 2011

(65) Prior Publication Data
US 2013/0121829 A1 May 16, 2013

(51) Int. Cl.
*F04B 35/04* (2006.01)
*F04B 17/03* (2006.01)
*H02K 5/16* (2006.01)

(52) U.S. Cl.
USPC ............. 417/354; 417/423.12; 310/401

(58) Field of Classification Search
USPC ............. 417/353, 354, 423.12; 310/67 R, 90, 310/401
See application file for complete search history.

(56) References Cited

U.S. PATENT DOCUMENTS 6,819,021 B1 * 11/2004 Horng et al. ............ 310/91
7,183,679 B2 * 2/2007 Liu ........................... 310/67 R

* cited by examiner

*Primary Examiner* — Bryan Lettman

(57) ABSTRACT

A bearing/stator set retainer structure includes a base seat, a stator set and a retainer member. The base seat has a bearing cup having an internal bearing hole in which a bearing is disposed. The stator set is assembled on the base seat and has an abutment section on one side distal from the base seat. The retainer member has at least one latch section for fixedly assembling the retainer member on the bearing cup. The retainer member further has at least one protrusion section in abutment with the abutment section and at least one inner flange section in abutment with the bearing. Accordingly, the retainer member can be easily disassembled from and reassembled with the bearing cup to facilitate reworking. Also, the retainer member is able to fix the bearing and the stator set at the same time to simplify the assembling process and prolong lifetime of the fan.

5 Claims, 5 Drawing Sheets

BEARING/STATOR SET RETAINER STRUCTURE

BACKGROUND OF THE INVENTION

1. Field of the Invention

The present invention relates to a bearing/stator set retainer structure, which facilitates reworking and is able to fix both the bearing and the stator set at the same time to simplify the assembling process and prolong lifetime of the fan.

2. Description of the Related Art

Recently, all kinds of electronic information products (such as computers) have been more and more popularly used and widely applied to various fields. There is a trend to increase processing speed and expand access capacity of the electronic information products. Therefore, the electronic components of the electronic information products have operated at higher and higher speed. When operating at high speed, the electronic components generate high heat at the same time.

With a computer host taken as an example, the central processing unit (CPU) in the computer host generates most of the heat generated by the computer host in operation. In case the heat is not efficiently dissipated, the temperature of the CPU will rise very quickly to cause deterioration of the execution efficiency. When the accumulated heat exceeds a tolerable limit, the computer will crash or even burn down in some more serious cases. Moreover, for solving the problem of electromagnetic radiation, the computer host is often enclosed in a computer case. This will affect the dissipation of the heat generated by the computer host. Therefore, it has become a critical issue how to quickly conduct out and dissipate the heat generated by the CPU and other heat-generating components.

Conventionally, a heat sink and a cooling fan are arranged on the CPU to quickly dissipate heat. One side of the heat sink has multiple radiating fins, while the other side of the heat sink is free from any radiating fin. The surface of the other side of the heat sink directly contacts the CPU for conducting heat to the radiating fins. The radiating fins serve to dissipate the heat by way of radiation. In addition, the cooling fan cooperatively forcedly drives airflow to quickly carry away the heat.

A conventional cooling fan includes a base seat. A hollow bearing cup protrudes from the base seat. A bearing is disposed in the bearing cup in a press-fit manner. A stator set is mounted around the bearing cup in a press-fit manner. A fan impeller is rotatably disposed assembled on the bearing cup. The fan impeller has multiple blades radially extending from a hub of the fan impeller, and a shaft rod fitted and located in the bearing. When the fan impeller operates, the bearing cup and the bearing will shake and swing to shorten the lifetime of the fan. Also, the stator set may detach from the bearing cup due to the shake in operation. In order to solve the problem of shake, it is necessary to use a retainer member to fixedly locate the bearing or the stator set. This complicates the assembling process and increases the cost. Moreover, after the bearing is fixed with the retainer member, it is impossible to rework the retainer member. This makes it impossible to check and repair the components during the manufacturing and assembling process. Therefore, the conventional device has the following shortcomings:

1. It is impossible to rework the retainer member.
2. The assembling process is complicated.
3. The manufacturing cost is increased.
4. The lifetime is shortened.

SUMMARY OF THE INVENTION

A primary object of the present invention is to provide a bearing/stator set retainer structure, which facilitates reworking and is able to fix both the bearing and the stator set at the same time to simplify the assembling process.

A further object of the present invention is to provide the above bearing/stator set retainer structure, which prolongs lifetime of the fan.

To achieve the above and other objects, the bearing/stator set retainer structure of the present invention includes a base seat, a stator set and a retainer member. The base seat has a bearing cup upward extending from the base seat. The bearing cup has an internal bearing hole and at least one split in communication with the bearing hole. The base seat further has a rest section in the bearing hole in connection with the split. A bearing is positioned on the rest section. The stator set is disposed on the base seat. The stator set has a through hole in which the bearing cup is fitted. The stator set further has an abutment section on one side distal from the base seat in abutment with top end of the bearing cup. The retainer member has at least one latch section for fixedly assembling the retainer member on the bearing cup. The retainer member further has at least one protrusion section on an outer circumference of the retainer member. The retainer member further has at least one inner flange section. The protrusion section is positioned at a top end of the latch section. A free end of the latch section is formed with a hook section. The stator set is assembled around the bearing cup with the abutment section in abutment with the top end of the bearing cup. The retainer member is assembled on the bearing cup with the latch section in alignment with the split. The latch section passes through the split with the hook section latched under the rest section. Accordingly, the retainer member can be fixedly capped on the bearing cup. The latch section with the hook section can be unlatched from the rest section and extracted from the split, whereby the retainer member can be easily disassembled from and reassembled with the bearing cup to facilitate reworking. The retainer member is fixedly capped on the bearing cup with the protrusion section in abutment with the abutment section. Accordingly, the retainer member is able to fix both the bearing and the stator set at the same time to reduce the number of assembling steps and prolong lifetime of the fan.

According to the above, the present invention has the following advantages:

1. The reworking is facilitated.
2. The number of assembling steps is reduced.
3. The manufacturing cost is lowered.
4. The lifetime is prolonged.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
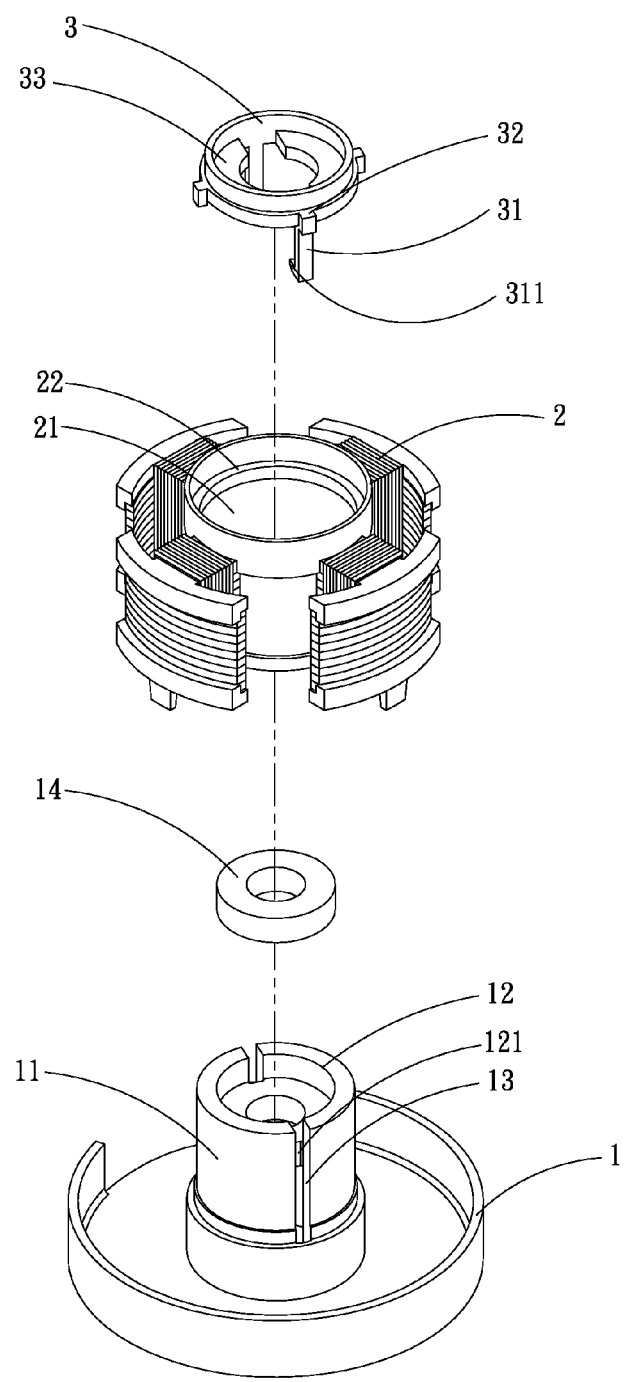
FIG. 1 is a perspective exploded view of a first embodiment of the present invention.
Figure 2:
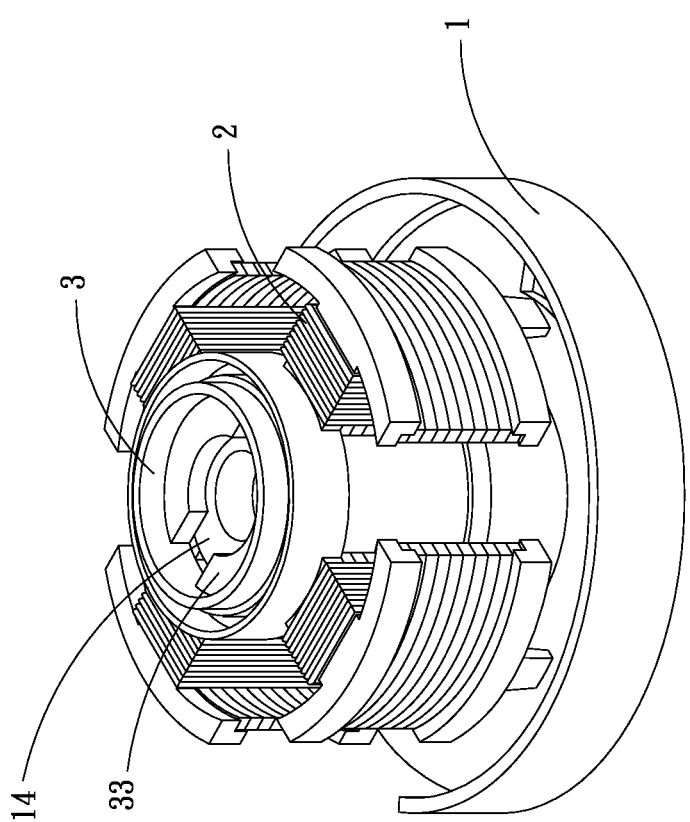
FIG. 2 is a perspective assembled view of the first embodiment of the present invention.
Figure 3:
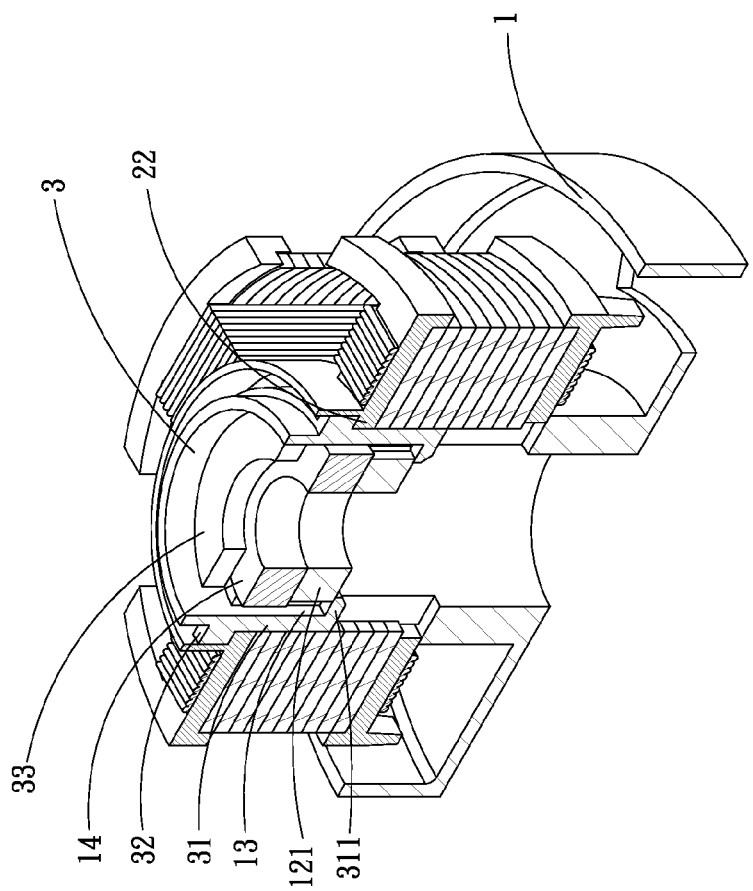
FIG. 3 is a perspective sectional view of the first embodiment of the present invention.

Please refer to FIGS. 1, 2 and 3. FIG. 1 is a perspective exploded view of a first embodiment of the present invention. FIG. 2 is a perspective assembled view of the first embodiment of the present invention. FIG. 3 is a perspective sectional view of the first embodiment of the present invention. According to the first embodiment, the bearing/stator set retainer structure of the present invention includes a base seat 1, a stator set 2 and a retainer member 3.

The base seat 1 has a bearing cup 11 upward extending from the base seat 1. The bearing cup 11 has an internal bearing hole 12 and at least one split 13 in communication with the bearing hole 12. The base seat 1 further has a rest section 121 in the bearing hole 12 in connection with the split 13. A bearing 14 is positioned on the rest section 121. The bearing 14 is selected from a group consisting of ball bearing, roller bearing, needle bearing, ceramic bearing and oil-retaining bearing. In this embodiment, the bearing is, but not limited to, a roller bearing for illustration purposes only.

The stator set 2 is disposed on the base seat 1 and fitted around the bearing cup 11. The stator set 2 has a central through hole 21 in which the bearing cup 11 is fitted. The stator set 2 further has an abutment section 22 on one side distal from the base seat 1 in abutment with top end of the bearing cup 11.

The retainer member 3 is assembled on the bearing cup 11. The retainer member 3 has at least one latch section 31 and at least one protrusion section 32 on an outer circumference of the retainer member 3. The retainer member 3 further has at least one inner flange section 33. The protrusion section 32 is positioned at a top end of the latch section 31. A free end of the latch section 31 is formed with a hook section 311.

The stator set 2 is assembled around the bearing cup 11 with the abutment section 22 in abutment with the top end of the bearing cup 11. The retainer member 3 is assembled on the bearing cup 11 with the latch section 31 in alignment with the split 13. The latch section 31 passes through the split 13 with the hook section 311 latched under the rest section 121. Accordingly, the retainer member 3 can be fixedly capped on the bearing cup 11. The latch section 31 with the hook section 311 can be unlatched from the rest section 121 and extracted from the split 13, whereby the retainer member 3 can be easily disassembled from and reassembled with the bearing cup 11 to facilitate reworking. The retainer member 3 is fixedly capped on the bearing cup 11 with the protrusion section 32 positioned on the abutment section 22, whereby the abutment section 22 is affixed onto the bearing cup 11. The inner flange section 33 abuts against the top end of the bearing 14 to affix the bearing 14 in the bearing hole 12 on the rest section 121. Accordingly, the retainer member 3 is able to fix both the bearing 14 and the stator set 2 at the same time to reduce the number of assembling steps and prolong lifetime of the fan.

Figure 4:
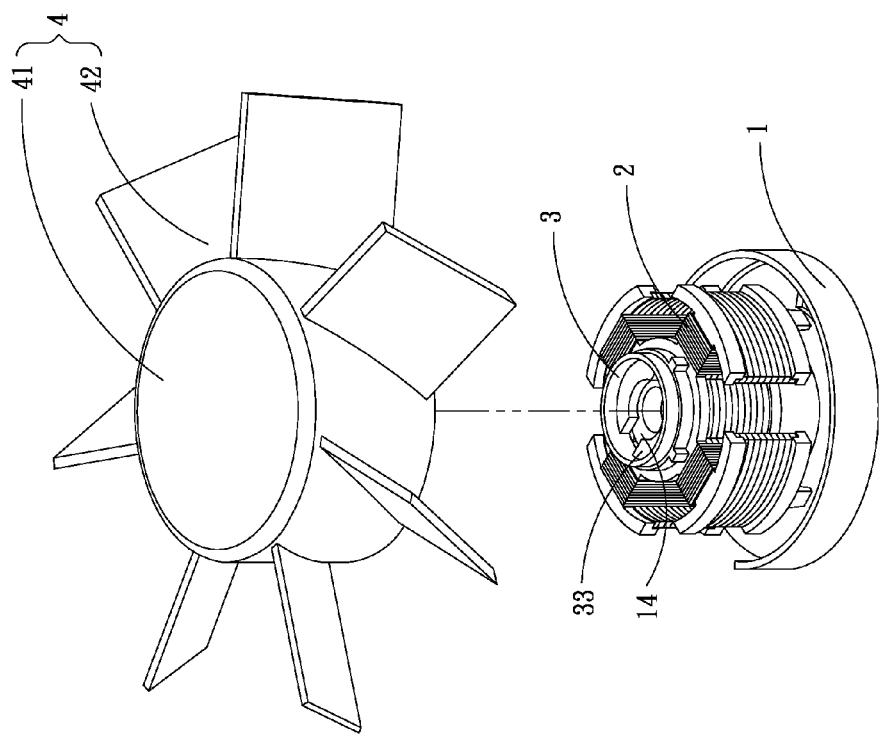
FIG. 4 is a perspective exploded view of a second embodiment of the present invention.
Figure 5:
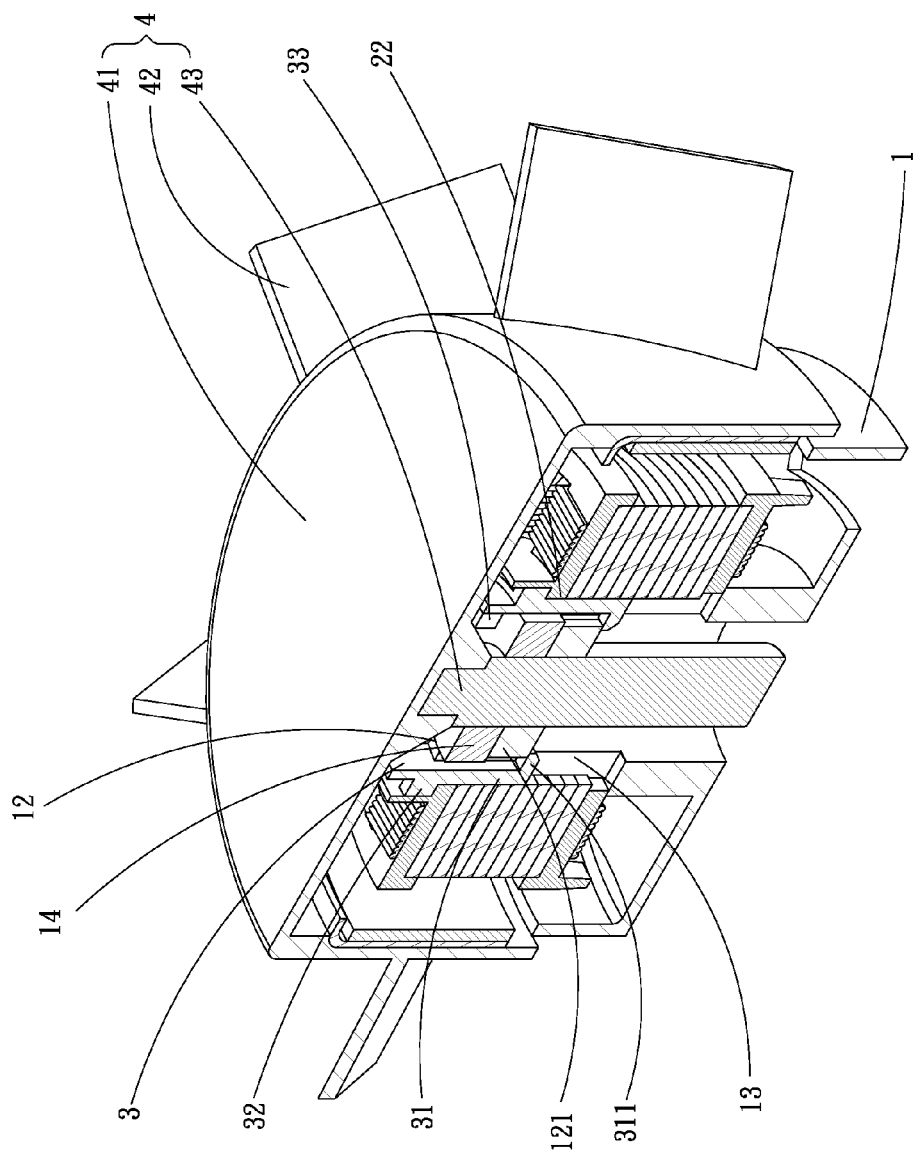
FIG. 5 is a perspective sectional view of the second embodiment of the present invention.

Please refer to FIGS. 4 and 5. FIG. 4 is a perspective exploded view of a second embodiment of the present invention. FIG. 5 is a perspective sectional view of the second embodiment of the present invention. In the second embodiment, a fan impeller 4 is assembled on the base seat 1. The fan impeller 4 has a hub 41, multiple blades 42 and a shaft rod 43. The blades 42 radially extend from an outer circumference of the hub 41 in a direction away from the hub 41. The shaft rod 43 is rotatably fitted in the bearing 14 to form a fan device. As aforesaid, the latch section 31 of the retainer member 3 passes through the split 13 of the bearing cup 11 with the hook section 311 latched under the rest section 121. The retainer member 3 is fixedly capped on the bearing cup 11 with the protrusion section 32 positioned on the abutment section 22, whereby the abutment section 22 is affixed onto the bearing cup 11. The inner flange section 33 abuts against the top end of the bearing 14 to affix the bearing 14 in the bearing hole 12 on the rest section 121. Accordingly, the retainer member 3 is able to fix both the bearing 14 and the stator set 2 at the same time to reduce the number of assembling steps and prolong lifetime of the fan.

The above embodiments are only used to illustrate the present invention, not intended to limit the scope thereof. It is understood that many changes and modifications of the above embodiments can be made without departing from the spirit of the present invention. The scope of the present invention is limited only by the appended claims.

What is claimed is:

1. A bearing/stator set retainer structure comprising:
a base seat having a bearing cup upward extending from the base seat, the bearing cup having an internal bearing hole in which a bearing is disposed;
a stator set having a through hole in which the bearing cup is fitted, the stator set further having an abutment section on one side distal from the base seat; and
a retainer member having at least one latch section for assembling the retainer member on the bearing cup, the retainer member further having at least one protrusion section on an outer circumference of the retainer member in a position where the abutment section is positioned, the retainer member further having at least one inner flange section in abutment with the bearing, wherein the bearing cup is formed with at least one split in communication with the bearing hole, wherein the bearing cup further has a rest section in the bearing hole in connection with the split, the bearing being disposed on the rest section, and wherein the latch section is formed on the outer circumference of the retainer member in a position where the split is formed, a free end of the latch section being formed with a hook section, the latch section passing through the split with the hook section latched under the rest section.

2. The bearing/stator set retainer structure as claimed in claim 1, wherein the protrusion section is positioned at a top end of the latch section.

3. The bearing/stator set retainer structure as claimed in claim 1, wherein a fan impeller is assembled on the base seat, the fan impeller including a hub, multiple blades and a shaft rod, the blades radially extending from an outer circumference of the hub in a direction away from the hub, the shaft rod being rotatably fitted in the bearing to form a fan device.

4. The bearing/stator set retainer structure as claimed in claim 1, wherein the stator set is fitted around the bearing cup with the abutment section in abutment with the top end of the bearing cup, the retainer member being fixedly capped on the bearing cup with the protrusion section positioned on the abutment section to affix the abutment section onto the bearing cup.

5. The bearing/stator set retainer structure as claimed in claim 1, wherein the inner flange section of the retainer member abuts against the top end of the bearing to affix the bearing in the bearing hole.

* * * * *